United States Patent [19]

Shero et al.

[11] Patent Number: 4,695,783

[45] Date of Patent: Sep. 22, 1987

[54] INDUCTION MOTOR CONTROL APPARATUS AND METHOD

[75] Inventors: David J. Shero, South Park Twp., Allegheny County, Pa.; Habib Dadpey, Atlanta, Ga.

[73] Assignee: Westinghouse Electric Corp., Pittsburgh, Pa.

[21] Appl. No.: 790,009

[22] Filed: Oct. 22, 1985

[51] Int. Cl.$^4$ .............................................. H02P 5/41
[52] U.S. Cl. ................................. 318/808; 318/802; 318/805; 363/96
[58] Field of Search ............... 318/798, 802, 803, 805, 318/807, 808, 811; 363/41, 96, 98, 136; 323/207

[56] References Cited

U.S. PATENT DOCUMENTS

| | | | |
|---|---|---|---|
| 4,243,927 | 1/1981 | D'Atre | 318/803 |
| 4,255,695 | 3/1981 | Plunkett et al. | 318/802 X |
| 4,276,504 | 6/1981 | Nagase et al. | 318/802 X |
| 4,426,611 | 1/1984 | Espelage et al. | 318/798 X |
| 4,441,064 | 4/1984 | Cutler et al. | 318/798 |
| 4,443,747 | 4/1984 | Chausse et al. | 318/802 X |
| 4,447,788 | 5/1984 | Mundt et al. | 318/808 X |
| 4,455,522 | 6/1984 | Lipo | 318/807 X |
| 4,599,549 | 7/1986 | Mutoh et al. | 318/798 |

Primary Examiner—Patrick R. Salce
Assistant Examiner—Marc S. Hoff
Attorney, Agent, or Firm—J. L. Brzuszek

[57] ABSTRACT

A control apparatus and method are provided for a load energized by an inverter coupled with a DC power source. The lag current angle between the current and the load voltage is utilized to determine when the output current is positive and when the output current is negative. The conduction times of the respective upper and lower gate turn off thyristors of each pole of the inverter are controlled in relation to the established current angle, with a provided modification of those conduction times being phased out in response to the desired output voltage for said load.

11 Claims, 26 Drawing Figures

4,695,783

INDUCTION MOTOR CONTROL APPARATUS AND METHOD

CROSS REFERENCE TO RELATED APPLICATIONS

The present application is related to the following patent applications Ser. No. 696,814 by D. J. Shero et al. and entitled "Induction Motor Synthesis Control Apparatus And Method", Ser. No. 696,832 by H. Dadpey et al. and entitled "Torque Determination For Control Of An Induction Motor Apparatus" and Ser. No. 696,833 by D. J. Shero et al. and entitled "Induction Motor Control Apparatus And Method", which patent applications were filed Jan. 31, 1985 and are assigned to the same assignee and the disclosures of which are incorporated herein by reference.

BACKGROUND OF THE INVENTION

1. Field of the Invention

This invention relates in general to the control of an induction motor apparatus driven from a DC power source through an inverter.

2. Description of the Prior Art

In a variable voltage and variable frequency AC motor drive apparatus the three phase input voltage from either a DC or a rectified AC source is applied to the motor through an inverter including a network of six power switches. A typical power switch is a gate turn off thyristor. If these power switches were ideal in operation and did not have switching time delays, the output voltage waveforms from the inverter as applied to the motor would be substantially the same as theoretical square waveforms. However the switches do have time delays which change the output voltage waveforms. It is difficult to run the motor as desired without the feedback measurement of the voltage out of the inverter and compensation of the output voltage for the dead time switching effects with the use of a motor controller to adjust the synthesis operation to provide the desired output voltage, and such feedback requires additional isolation and signal correction operations.

SUMMARY OF THE INVENTION

The firing time of each inverter switch is increased or decreased in relation to the motor speed, the DC input power, the total switching time, the switching frequency and the angle between the fundamental voltage and the current waveforms.

DESCRIPTION OF THE PREFERRED EMBODIMENTS

Figure 1:
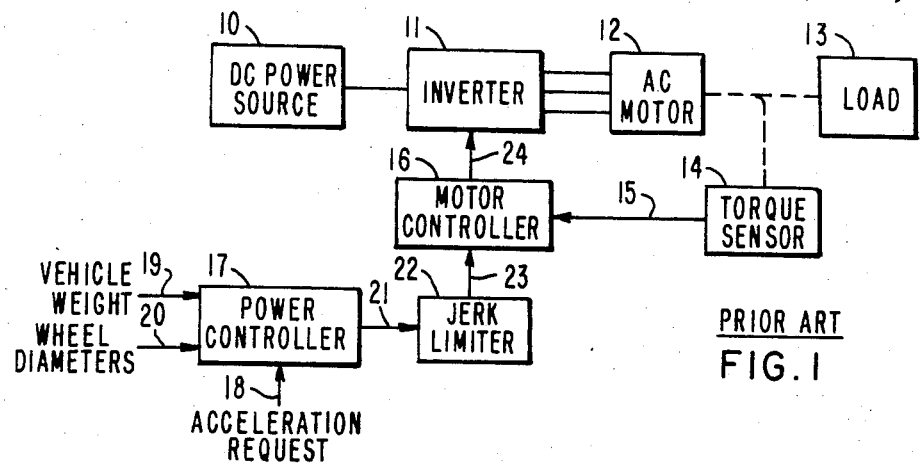
FIG. 1 shows a prior art AC induction motor control apparatus.

In FIG. 1 there is shown a prior art AC induction motor control apparatus including a DC power source 10 coupled with an inverter 11 for determining the operation of a three phase AC induction motor 12 connected with a load 13, which can represent a transit vehicle. A torque sensor 14 is coupled with a motor 12 to provide a torque feedback 15 to a motor controller 16. A power controller 17 receives as inputs an acceleration request 18 from the transit vehicle operator, the transit vehicle weight 19 and the transit vehicle wheel diameters 20. The power controller 17 produces a torque effort request 21 which represents the torque to be achieved by the AC motor 12 in order to accelerate the transit vehicle load 13 at the rate defined by acceleration request 18. A jerk limiter 22 takes the torque effort request 21 and provides a jerk limited torque effort request 23 to the motor controller 16. The motor controller 16 produces GTO switch firing pulses 24 for the inverter 11 in order to match the torque feedback 15 with the torque effort request 23.

Figure 2:
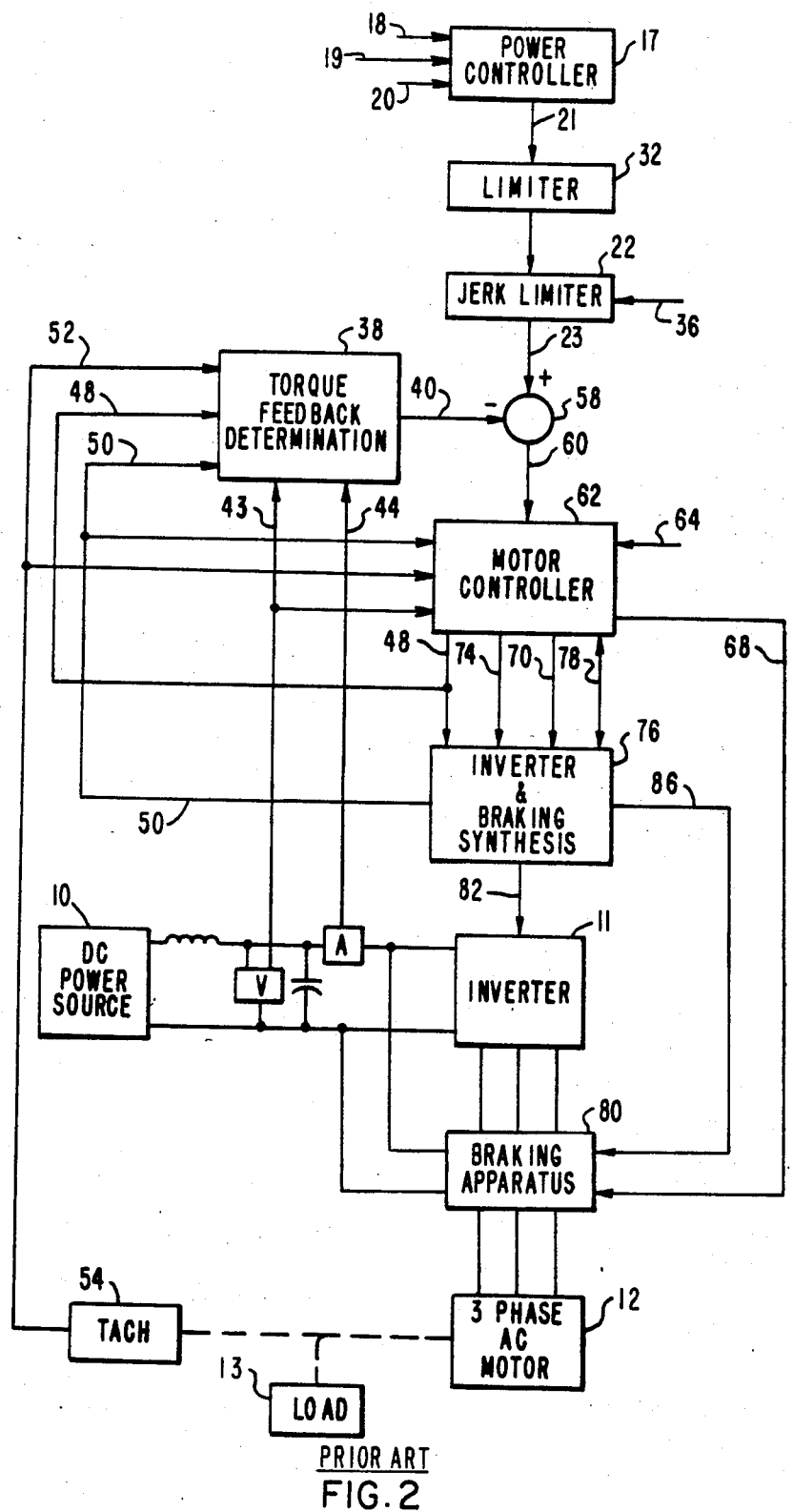
FIG. 2 shows a block diagram of the prior art AC induction motor control apparatus.

In FIG. 2 there is shown a suitable motor control apparatus for operation in accordance with the present invention to control a three phase AC motor 12 such as the propulsion motor of a mass transit passenger vehicle, which control apparatus is disclosed in a greater detail in above-referenced patent application Ser. No. 696,833. The vehicle operator provides to power controller 17 a vehicle acceleration request 18 which by taking into account the vehicle weight 19 and vehicle wheel diameters 20 the power controller 17 translates into a torque effort request signal 21 that is input to a signal limiter 32 for preventing unreasonable torque effort requests. A jerk limiter 22 is provided in relation to a desired jerk rate 36 for establishing a jerk limited torque request 23 for the comfort of the vehicle passengers. A torque feedback determination apparatus 38 determines the torque feedback 40, by measuring the system input power in relation to the DC voltage 43 and DC current 44 provided by a power source 10 and in relation to the inverter frequency 48 and the synthesis mode 50 and the tachometer speed 52 provided by a tachometer 54 coupled with the propulsion motor 12, to estimate the output torque of the motor 12. The torque feedback signal 40 is supplied to the negative input of a summing junction 58 for comparison with the jerk limited torque request signal 23 supplied to the positive input of the summing junction 58. The resulting torque error signal 60 is supplied to a motor controller 62. A car control enable signal 64 from the operator permits the propulsion motor 12 to run or not. Other needed inputs by the motor controller 62 consists of the DC line voltage 43 and the synthesis mode of the inverter 50. The motor controller 62 outputs the braking thyristors enable 68, the requested braking angle 70, the requested inverter frequency 48 and the requested inverter voltage percent 74 to the inverter and braking synthesis apparatus 76, which in addition has as an input and output the control state signal 78. The inverter and braking synthesis apparatus 76 provides the synthesis mode signal 50 to the motor control 62 and to the torque feedback determination apparatus 38. When the motor 12 is in brake operation with additional voltage supplied by the transformer braking circuit 80 the control state signal 78 operates to keep the synthesis mode in six step and prevents a change to the quasi six step or PWM modes. The inverter and braking synthesis apparatus 76 outputs the inverter GTO firing pulses 82 to the inverter 11 and brake GTO firing pulses 86 to the braking circuit 80. The inverter 11 drives a motor 12 in power and in brake operation, and a braking circuit 80 operates with the motor 12 when additional braking torque is desired above base speed operation.

Figure 3:
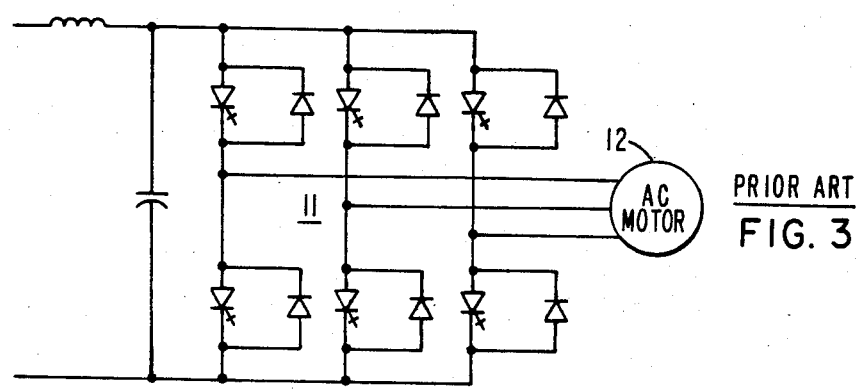
FIG. 3 shows a prior art three phase inverter for an AC motor drive.

In FIG. 3 there is shown a prior art three phase inverter, including three poles, for an AC motor drive.

Figure 4:
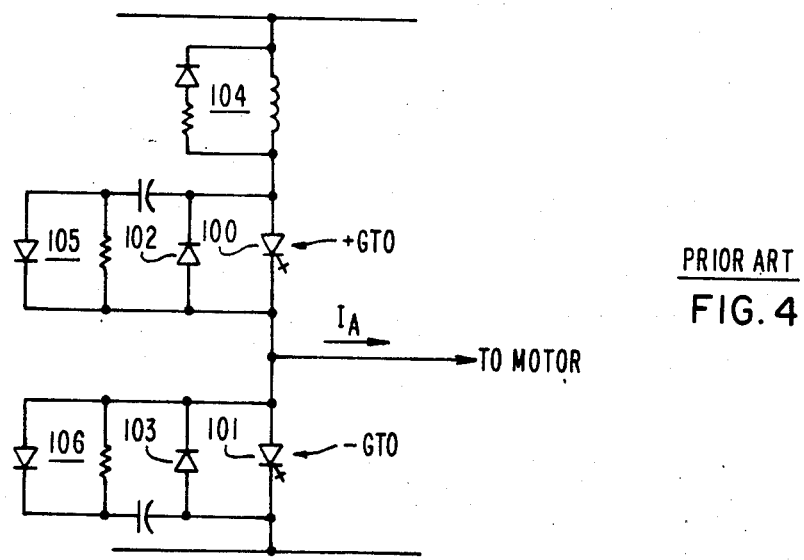
FIG. 4 shows one pole of the prior art AC drive inverter shown in FIG. 3.

FIG. 4 shows one pole of the prior art AC inverter shown in FIG. 3, which includes two gate turn off thyristors 100 and 101, two free wheeling diodes 102 and 103, one current snubber circuit 104 provided to limit the di/dt change in current through the GTO switches and a first voltage snubber circuit 105 operative with the GTO thyristor switch 100 and a second voltage snubber circuit 106 operative with the second GTO thyristor switch 101. By using various known pulse width modulation techniques, three phase AC voltage and current waveforms can be obtained from a DC voltage source using the inverter shown in FIG. 3 and suitable for the desired control of an AC induction motor.

Figure 5:
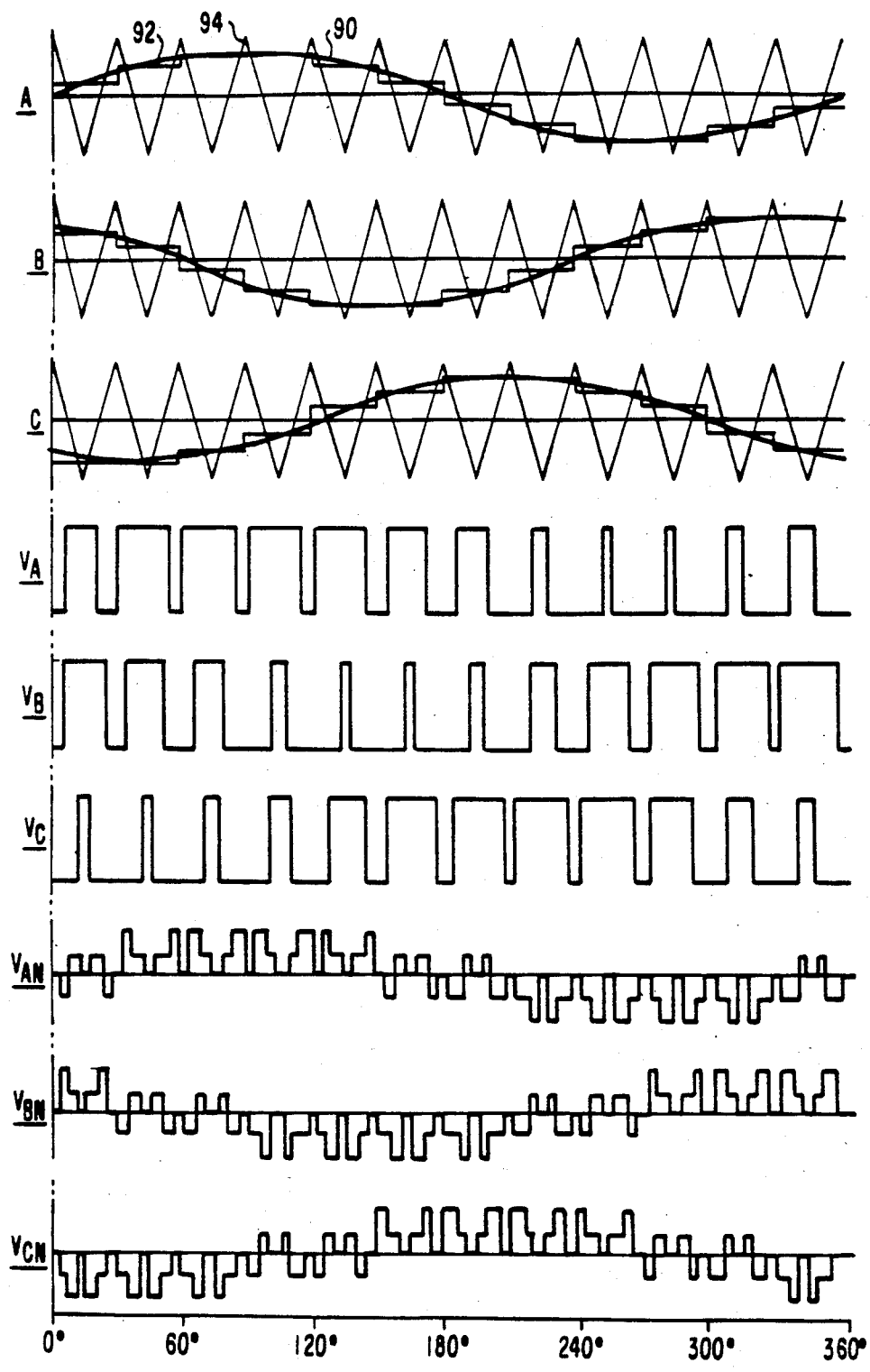
FIG. 5 shows idealized voltage waveforms produced by the inverter of FIG. 3 using uniform sampling pulse width modulation.

In FIG. 5 there are shown idealized voltage waveforms produced by the inverter of FIG. 3, and these are illustrated on the assumption that the switching time required to switch operation between the plus GTO thyristor switch 100 and the minus GTO thyristor switch 102 is negligible, which assumption is not entirely correct in practical operation. The GTO on times and the GTO off times are determined to provide the desired waveforms, with dead times purposely inserted where neither GTO switch is allowed to be on to assure that the GTO switch being turned on is not completed until after the GTO switch being turned off is definitely off to avoid an undesired shoot through fault current. The required dead times and switching times shift the voltage transitions depending upon the current direction through the pole at the time of the voltage transition.

Figure 6:
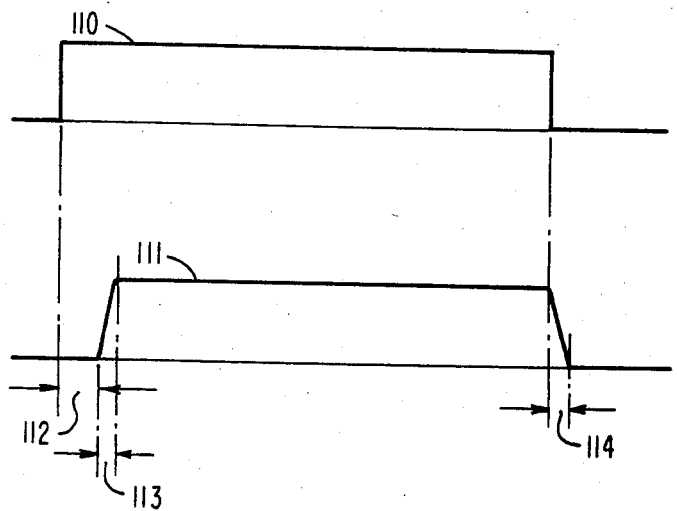
FIG. 6 shows the effects of dead times, turn on times, and turn off times on an inverter pole output voltage when the pole current is in the positive direction.

In FIG. 6, the desired pole voltage 110 is shown in relation to the actual pole voltage 111, for a current direction that is positive from the inverter pole to the motor, in the direction as shown by arrow IA in FIG. 4. The actual pole voltage 111 is shifted by the provided dead time 112 of 35 microseconds, the plus GTO turn on time 113 of 10 microseconds and the plus GTO turn off time 114 of 15 microseconds.

Figure 7:
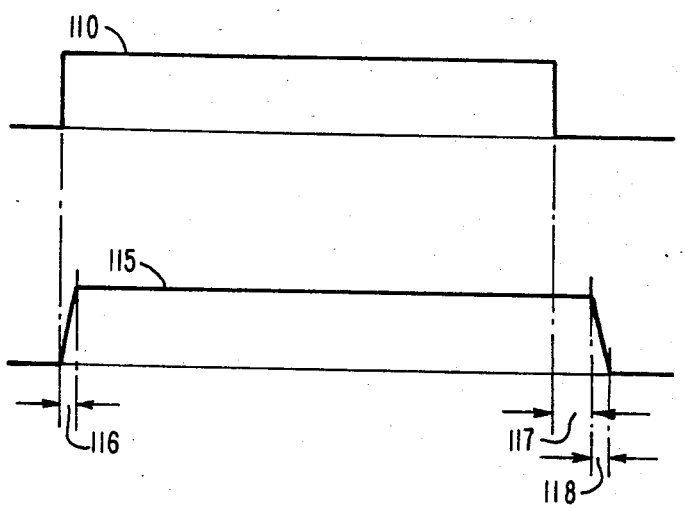
FIG. 7 shows the effects of dead times, turn on times, and turn off times on an inverter pole output voltage when the pole current is in the negative direction.

In FIG. 7, the desired pole voltage 110 is shown in relation to the actual pole voltage 115, for a current direction that is negative from the motor to the inverter pole. The actual pole voltage 115 is shifted by the minus GTO turn off time 116, the provided dead time 117 of 35 microseconds and the minus GTO turn on time 118 of 10 microseconds.

This shifting of voltage transitions will result in either a reduced fundamental voltage output or an increased fundamental voltage output from the inverter, depending upon the angle between the output voltage and the output current. The amount that the output voltage will be either increased or decreased depends upon the switching times, the dead times, the switching frequency, and the angle between the fundamental voltage and current waveforms.

Figure 8A:
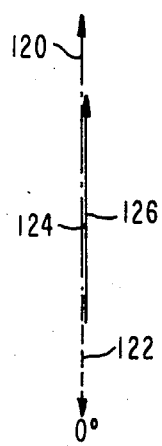
FIGS. 8A–8E show the effects of dead times on the desired inverter output voltage for various AC motor power factor phase angles.
Figure 8B:
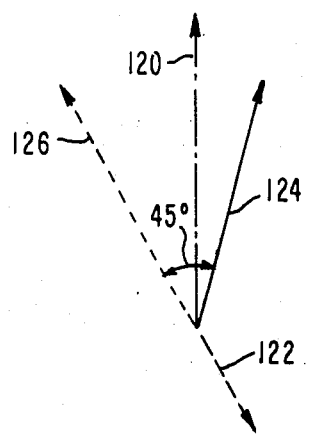
Figure 8C:
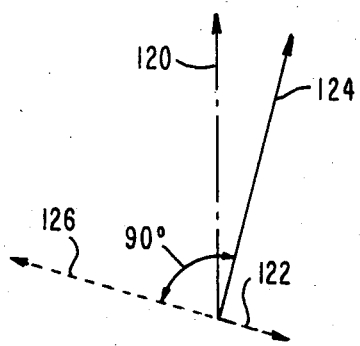
Figure 8D:
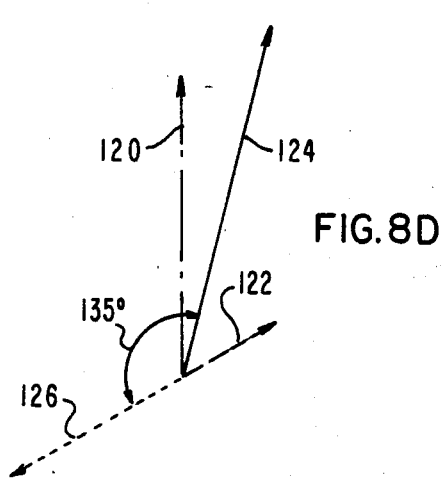
Figure 8E:
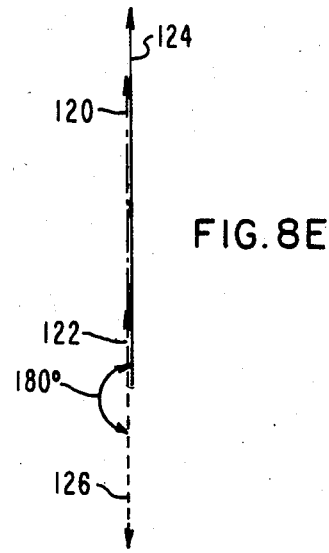

In FIG. 8A there is shown the desired voltage vector 120, the voltage vector 122 due to the GTO dead times, the resulting actual voltage vector 124 and the vector 126 representing the output current, with the current vector in phase with the output voltage vector. FIG. 8B shows the current vector 126 that is 45° out of phase with the desired voltage vector 120. FIG. 8C shows the current vector 126 that is 90° out of phase with the actual output voltage vector 124. FIG. 8D shows the current voltage 126 that is 135° out of phase with the actual voltage vector 124. FIG. 8E shows the current vector 126 that is 180° out of phase with the actual voltage vector 124. The magnitudes of the vectors are not related to any particular switching frequency or switching time. The figures are intended to show qualitatively the effects of dead times on the desired voltage. The magnitude of the dead time voltage vector 122 will increase if either the dead time, the switching frequency or the DC inverter input voltage is increased and will decrease if any of these three variables are decreased. The magnitude of the dead time voltage vector 122 is not affected by the desired voltage vector 120 and is constant for any desired voltage output. Therefore it can be seen that the dead time voltage 122 can be more of a problem when low desired voltage outputs 124 are required such as at low inverter fundamental frequencies.

In FIG. 8A there is shown a motor operation in the power mode where the angle between the output voltage 124 and the output current 126 is 0°. If such an angle could be practically achieved the voltage 122 due to the dead times would be 180° out of phase with the output current 126. The result would be that the output voltage 124 will be in phase with the desired voltage 120 but reduced by the dead time voltage 122. FIG. 8B shows a motor operation in the power mode where the angle between the output voltage 124 and the output current 126 is 45°, and the voltage 122 due to the dead times is 180° out of phase with the output current 126. The resulting output voltage 124 leads the output current 126 by 45° and is smaller in magnitude by less than the full dead time voltage and shifted in phase from the desired output voltage 120. In FIG. 8C there is shown a motor operation with a braking mode where the output current 126 is 90° out of phase with the output voltage 124. The resulting output voltage 124 is slightly smaller in magnitude and shifted in phase from the desired voltage 120. In FIG. 8D there is shown a motor operation in the brake mode with the output current 126 that is 135° out of phase with the output voltage 124, and the resulting output voltage 124 is larger in magnitude but by less than a full dead time voltage and shifted in phase from the desired output voltage 120. In FIG. 8E there is shown an extreme brake mode operation with the output current 126 that is 180° out of phase from the output voltage 124. The voltage 122 due to the dead times would add to the desired voltage 120 and result in the output voltage 124 in phase with but larger in magnitude than the desired voltage 120.

Figure 9:
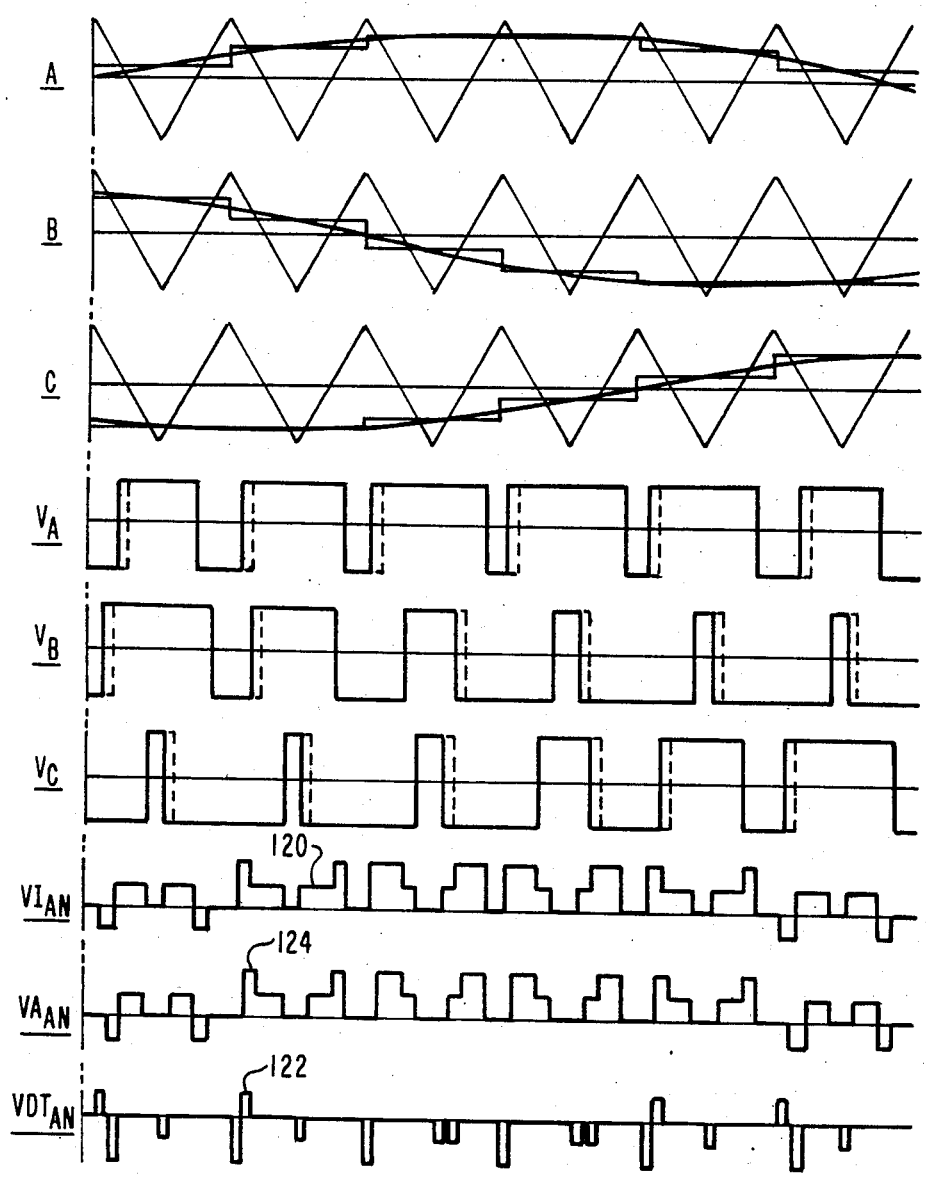
FIG. 9 shows the resulting time shift in voltage transition to produce dead time voltage vectors for 0° power factor phase angle operation of the inverter.
Figure 10:
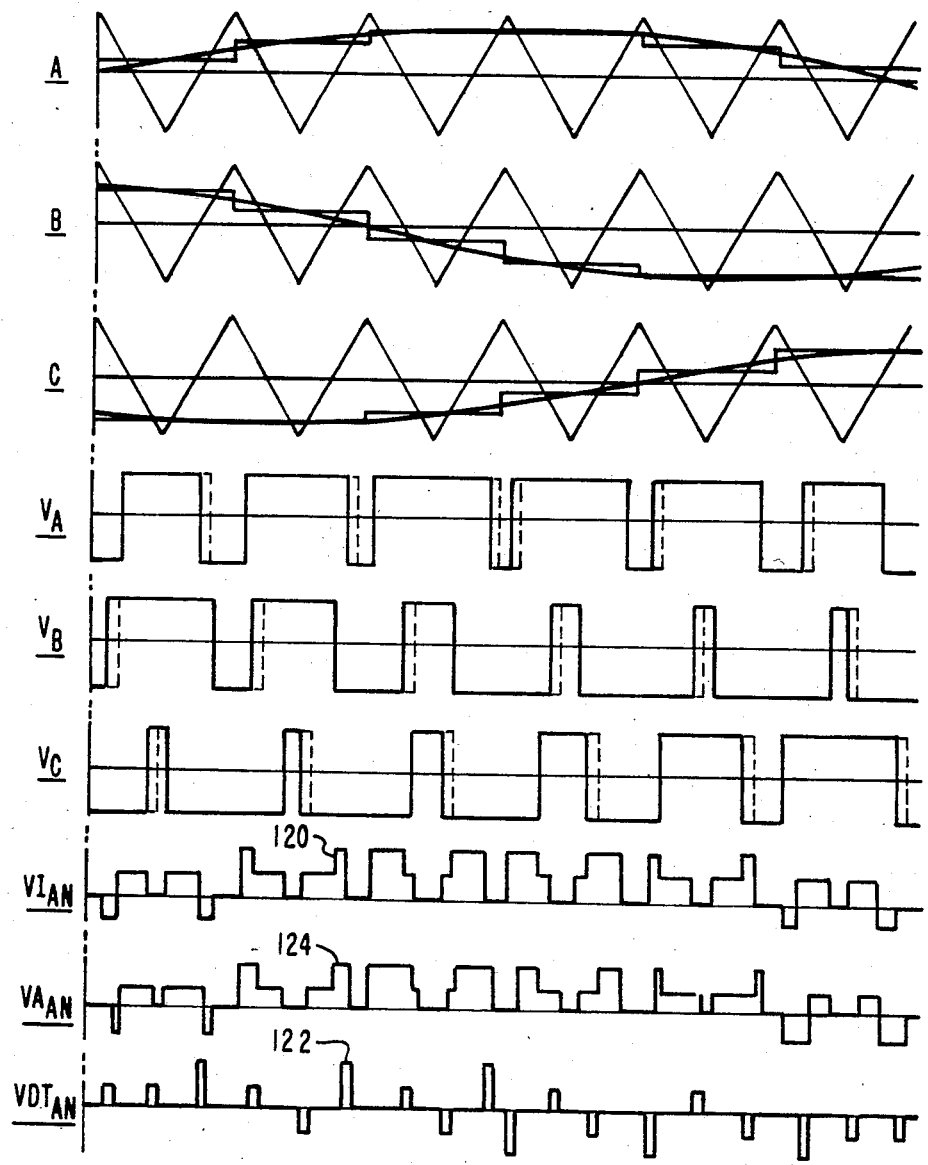
FIG. 10 shows the resulting time shift in voltage transition to produce the dead time voltage vectors for 90° power factor phase angle operation of the inverter.
Figure 11:
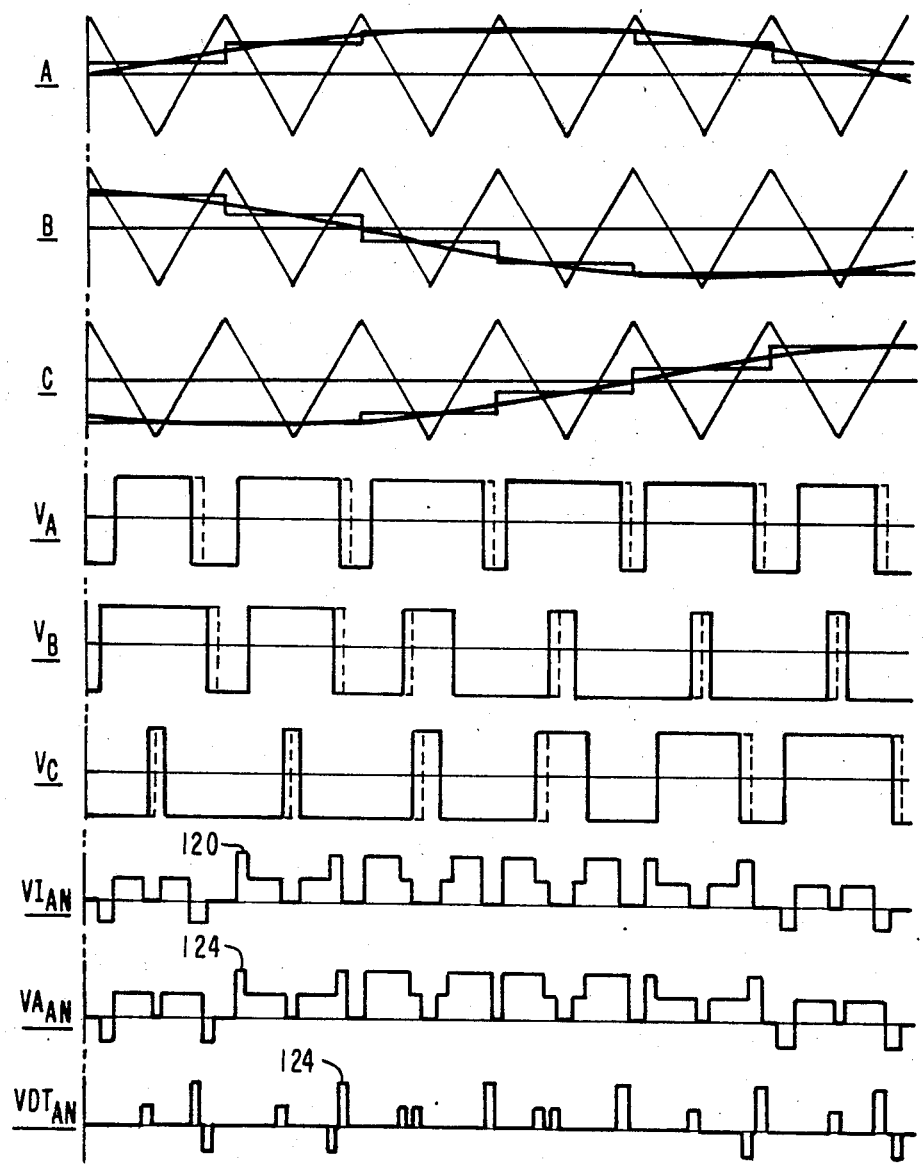
FIG. 11 shows the resulting time shift in voltage transition to produce the dead time voltage vectors for 180° power factor phase angle operation of the inverter.

FIGS. 9, 10 and 11 show respectively how the actual shifts in voltage transition produce the dead time voltage vectors for the cases of 0°, 90° and 180° between the voltage and current respectively. The fourth, fifth and sixth waveform in each figure shows the desired instantaneous voltage output for the respective poles shown with solid lines. The shift in voltage transitions due to dead times is shown with dotted lines. The seventh waveform shows the desired line-to-neutral motor voltage 120. The eighth waveform shows the actual output line-to-neutral motor voltage 124 for phase A with only one phase being shown. The ninth waveform shows the phase A dead time voltage 122 and for 0° as shown by FIG. 8A this voltage is 180° out of phase with the desired voltage 120 and therefore the actual output voltage 124 is lower than the desired voltage 120. For 180° operation as shown by FIG. 8E the dead time voltage 122 is in phase with the desired voltage 120 and therefore the actual output voltage 124 is higher than the desired voltage 120. For 90° operation the dead time voltage 122 is about 90° out of phase with the desired voltage 120 and therefore the actual output voltage 124 is about the same as the desired voltage 120 but shifted somewhat in phase. The phase shift does not present operational problems in the contemplated use of the inverter to energize an induction motor, however the voltage differences do present problems.

In the contemplated control system with the switching time as shown in FIG. 7 and using a switching frequency of 350 Hz, the voltage differential can be in excess of 20 volts rms at extreme angles. This 20 volts does not make a substantial difference at higher fundamental inverter frequencies in excess of 20 Hz where the desired rms output voltage is about 9.33 times the fundamental inverter frequency because the 20 volts is a small fraction of the total desired voltage. However at very low frequencies of about two Hz, where the desired rms output voltage is about 20 volts, this 20 volt differential can present a problem. If this voltage differential due to the GTO thyristor switch dead times is not compensated for there can occur a difficulty in starting the motor from zero speed.

For the correction of the GTO switch dead time voltage differential, it is known in the prior art to measure the fundamental voltage output from the inverter and to boost this output by increasing the voltage request from the inverter until the actual voltage output equals the desired output voltage. This method has several disadvantages including requiring the placement of voltage sensors in the inverter, requiring a filter circuit to filter out the fundamental voltage waveform and requiring an elaborate control system including both phase and amplitude information to control the output voltage.

In accordance with the present invention, above a predetermined motor speed, the angle between the voltage and current is calculated in relation to the DC power input to the inverter using the relationship:

$$\text{DC input power} = V_{DC\ Link} * I_{DC\ Link} \quad (1)$$

where the DC voltage and the DC current are already available in the memory of the microprocessor. This calculated angle is then used to determine the current direction through an inverter pole when a switch is made from one GTO being on to the other GTO being on in that pole. Knowing the current direction allows the microprocessor to then adjust the switch point of the GTO thyristors to compensate for the required switching time delay. The result is that the actual voltage output from the inverter is both in phase and substantially equal in amplitude to the desired fundamental inverter voltage.

Figure 12:
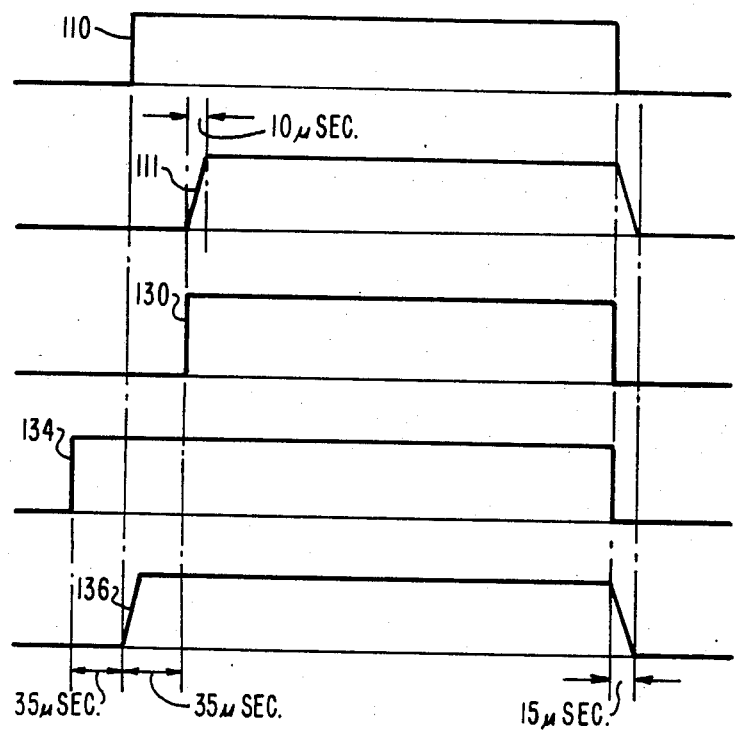
FIG. 12 shows the desired output pole voltage and the adjusted pole voltage command to obtain an approximated desired positive pole voltage when the pole current is positive.
Figure 13:
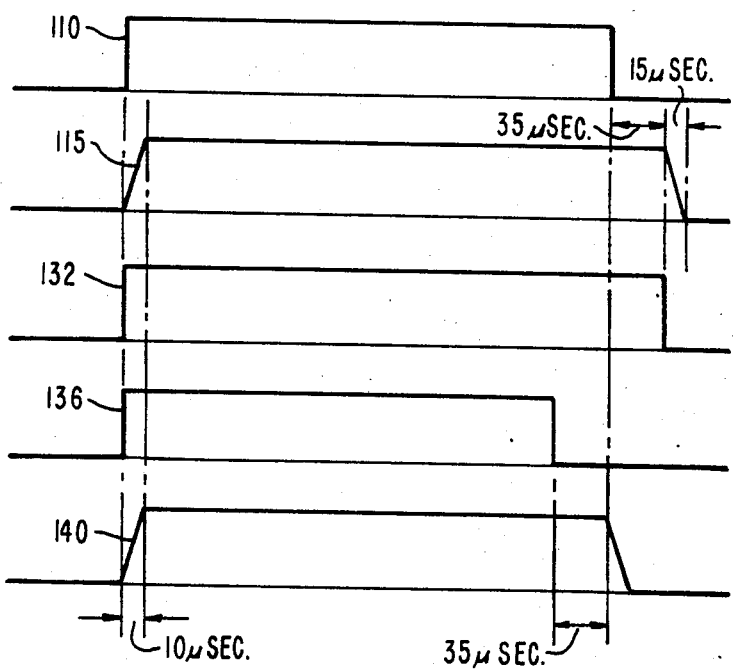
FIG. 13 shows the desired negative output pole voltage and the adjusted pole voltage command to obtain an approximated desired negative pole voltage when the pole current is negative.

The first two voltage waveforms 110 and 111 shown in FIG. 12 and 110 and 115 shown in FIG. 13 are the same as those shown in FIGS. 6 and 7 respectively for positive motor current and for negative motor current. The first waveform 110 of FIGS. 12 and 13 shows the desired output pole voltage of the inverter. The second waveform 111 shown in FIG. 12 and 115 shown in FIG. 13 shows the actual output voltage, with the voltage transitions shifted because of the effects of the switching times and dead times required. The third waveform 130 shown in FIG. 12 and 132 shown in FIG. 13 is a digital approximation of the second waveform 111 and 115, respectively, neglecting the GTO turn on and turn off times as they are quite a bit smaller than the dead times, which approximations are made to simplify the problem to be corrected. It is desired to make the actual output voltage waveform look like the desired first waveform.

To do this in relation to FIG. 12, where at the time of the desired voltage transition the motor current Ia is positive through the GTO thyristor 100 as shown in FIG. 4, it is necessary as shown in FIG. 12 to advance the minus to plus voltage transition by 35 microseconds which is equal to the inserted dead time 112. Since the effects of the GTO turn off time 114 are neglected it is not required to adjust the plus to minus voltage transition. The resulting adjusted pole voltage command 134 is provided to the GTO thyristor 100. The actual pole voltage 136 resulting from this adjusted command signal is shown in the fifth waveform, which voltage closely approximates the desired first waveform 110. If desired the GTO turn on and turn off time delays could be compensated for as well but this is not believed to be necessary.

In relation to FIG. 13, where at the time of the desired voltage transition the motor current Ia is negative through the GTO thyristor 101 as shown in FIG. 4, it is necessary to delay the plus to minus voltage transition by 35 microseconds, which is the inserted dead time 117 shown in FIG. 7. The second waveform 115 shows the resulting pole output voltage if the desired first waveform 110 is sent directly to the GTO thyristor 101 of the inverter pole without compensation. The third waveform 132 is a digital representation of the actual output voltage using the same approximations as mentioned for the operation shown in FIG. 12. Since the GTO turn off time effects are neglected there is no need to do anything to the minus to plus voltage transition. The fifth waveform 140 shows the pole output voltage resulting from the fourth waveform 136 being used as the GTO thyristor 101 command signal. Again it can be seen that the output voltage 140 closely approximates the desired first voltage waveform 110.

During actual experimentation it was discovered that adjusting for a 65 microsecond dead time instead of the theoretical 35 microsecond dead time improved the inverter operation, and was needed for more accurate voltage compensation. This extra adjustment is needed to compensate for various losses in the inverter such as snubber losses and GTO switching losses, which tend to subtract from the inverter output voltage when in power and tend to add to the inverter output voltage when in brake and therefore have the same effect on the output voltage as do the GTO switching dead times.

To provide the desired 65 microsecond voltage transition corrections with the microprocessor based waveform synthesis, as disclosed in above-referenced patent application Ser. No. 696,814, the following steps are performed. The microprocessor first calculates the minus and plus GTO firing times for each pole as it normally does in pulse width modulation waveform synthesis. The transition corrections are provided when the operation is with the pulse width modulation synthesis and not in the quasi six step or six step synthesis, because the voltage skewing due to dead times is more of a problem at low inverter fundamental frequencies where pulse width modulation is used. In the pulse width modulation synthesis disclosed in the last above-referenced patent application, the angles of the three phases of fundamental voltage waveforms are known since the minus and plus GTO firing times are calculated based on these angles. The angle between the output voltage and the current is calculated elsewhere in the control program and this information is available. The microprocessor then uses this phase angle information to establish if the fundamental output current of the inverter will be positive or negative at the time the minus to plus or plus to minus voltage transition will occur in each pole. If the microprocessor determines that the current is positive during a minus to plus voltage transition it will decrease the minus firing time preceding the transition by 65 microseconds and increase the plus firing time following the transition by the same amount of time to advance the transition by the correct amount of time. If the microprocessor determines that the current is positive during a plus to minus voltage transition there is no need to adjust the transition so nothing is done. If the microprocessor determines that the current is negative during a plus to minus voltage transition it will decrease the plus firing time preceding the transition by 65 microseconds and increase the minus firing time following a transition by the same amount of time to advance the transition by the correct amount of time. If the microprocessor determines that the current is negative during a minus to plus voltage transition there is no need to adjust the transition so nothing is done.

The microprocessor calculates the current angle, the angle by which the motor current lags the motor voltage, using one of two methods depending upon the operating frequency of the motor. In general, at low motor speed below about 390 rpm, which is equivalent to about 14.5 Hz electrical frequency for a four pole AC induction motor, a look-up table method is used. Above about 14.5 Hz a calculation method is used.

Figure 14:
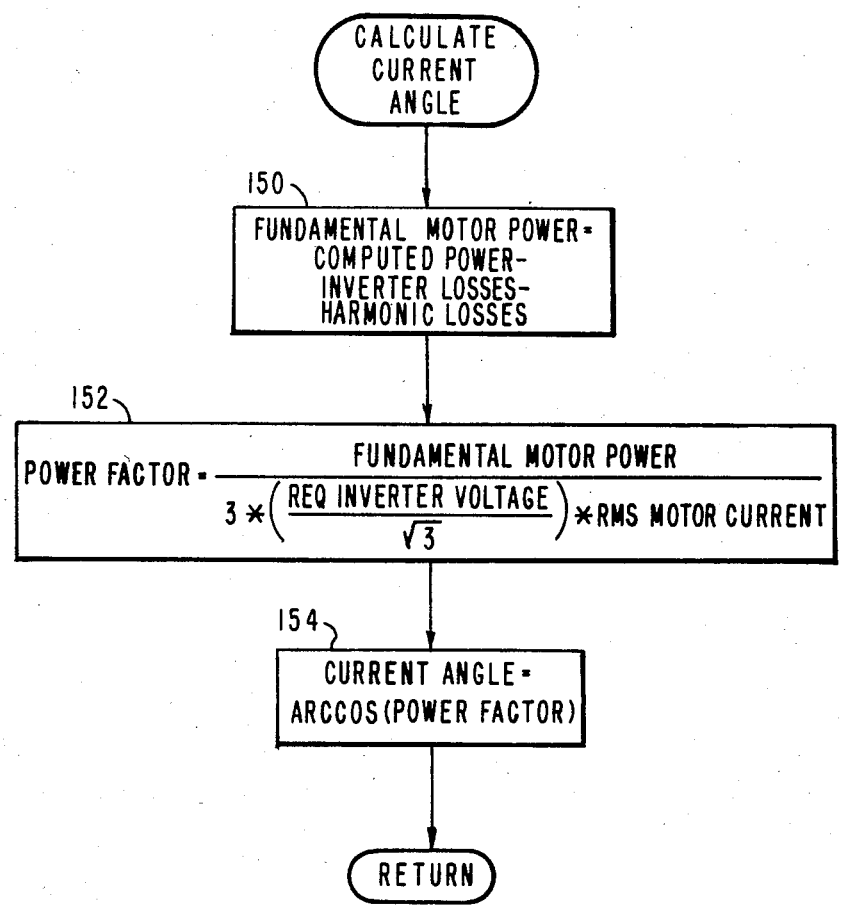
FIG. 14 shows a flow chart of the present calculate current angle program.

In FIG. 14, there is shown a flow chart of a program for determining the current angle with the calculation method which consists of the microprocessor computing the angle by performing the following steps.

(1) The computed input power to the inverter is computed using the above equation (1).

(2) The inverter power losses are computed as disclosed in the above-referenced patent application Ser. No. 696,832.

(3) The harmonic power losses are computed as disclosed in the above-referenced patent application Ser. No. 696,832.

(4) The fundamental input power to the motor is computed at block 150 using the following equation:

$$\text{Fundamental motor power} = \text{the computed input power} - \text{the inverter power losses} - \text{the harmonic power losses} \quad (2)$$

(5) The estimated rms motor current is computed as disclosed in above cross-referenced patent application Ser. No. 696,832.

(6) The power factor for the motor is computed at block 152 using the following equation:

$$\text{Power factor} = \frac{\text{Fundamental motor power}}{3 * \text{RMS motor voltage} * \text{RMS motor current}} \quad (3)$$

where: the RMS motor voltage is line to neutral voltage and is determined as follows:

$$\text{RMS motor voltage} = \frac{\text{requested inverter voltage line-to-line}}{\sqrt{3}} \quad (4)$$

The requested inverter voltage is an input to the waveform synthesis so it is known.

(7) The angle between the output voltage and the output current of the motor is computed at block 154 with the following equation:

$$\text{Angle} = \text{ARC COSINE} * \text{power factor} \quad (5)$$

For a microprocessor which does not have the capability of computing an arc cosine, then an arc cosine table can be used to accomplish this computation.

Figure 15:
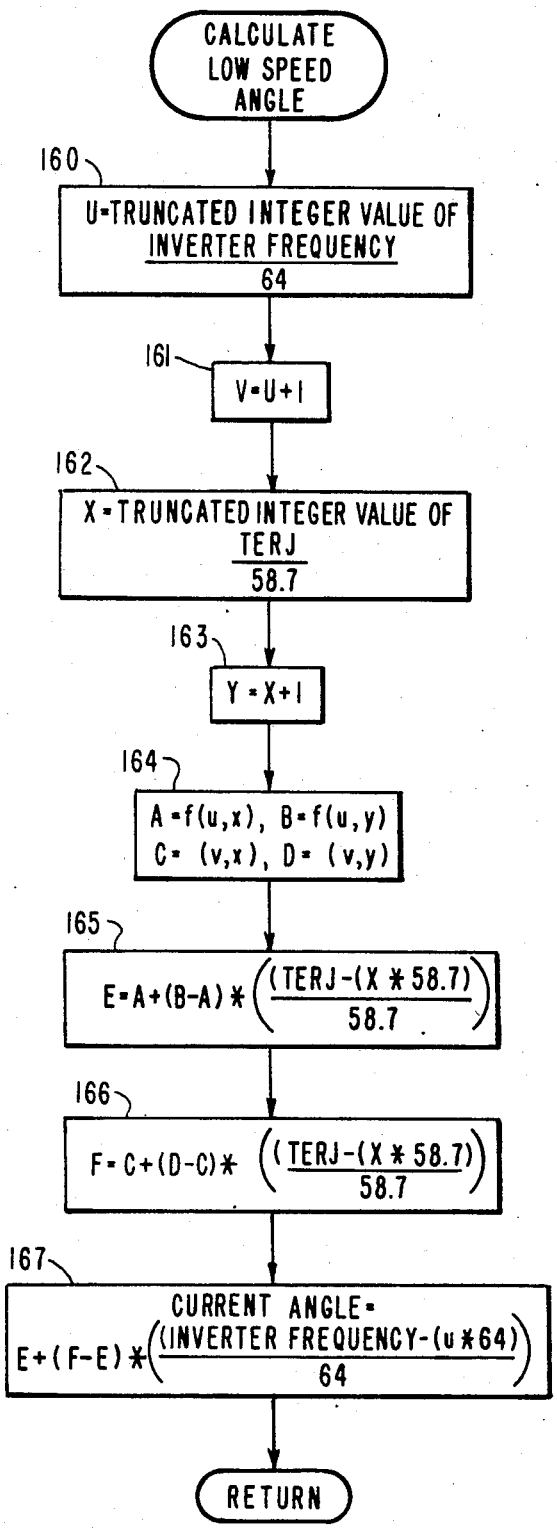
FIG. 15 shows a flow chart of the present low speed current angle determination program.

In FIG. 15 there is shown a flow chart of the present low speed current angle determination program, for determining the current angle for a motor speed below about 14.5 Hz. The look-up table method consists of using predetermined look-up tables to look up a current angle value based on the requested torque output of the motor. Since a constant volts per Hz type of control is used to determine the voltage to apply to the motor for any particular inverter frequency and slip, there will always be provided substantially the same voltage across the motor. Therefore for a particular motor torque at a particular inverter frequency there will ideally be the same angle between voltage and current. Some factors such as temperature changes and differences in system components result in the angle varying somewhat, however these variances are not significant enough to change the angle substantially. Therefore the angle is equal to a function of inverter frequency and motor torque, and a three dimensional look-up table is provided which contains off line precalculated values of this angle for various torques at various inverter frequencies.

The look-up table consists of several angle versus torque subtables determined by running motor models with an off-line computer for each Hz of inverter frequency from 0 to about 20 Hz, and the provision of which is well known to persons skilled in this motor control art. Interpolation is used to determine the inverter frequencies and torque values that are not actually realized in the table. For example to determine an angle for a condition of inverter frequency of 9.4 Hz and a torque request of 2.5 * 58.7 pound feet, the angle value is found corresponding to 2.5×58.7 pound feet in a 9 Hz table and the angle value is found corresponding to 2.5 * 58.7 pound feet in the 10 Hz table, and the following calculation is performed to establish the angle for 9.4 Hz frequency and 500 pound feet. The angle at 9.4 Hz equals the angle at 9 Hz in addition to 0.4 times the difference between the angle at 10 Hz and the angle at 9 Hz. The reason for using the look-up table method at low motor speed instead of the computation method is that at low motor speed the losses in the system become a large portion of the total input power. Therefore any errors in loss calculations greatly affect the torque calculation. Any error in the loss calculations and torque calculation also affects the motor current estimation and thus greatly affects the angle calculation. In fact, as disclosed in the above-referenced patent application Ser. No. 696,832, the torque calculations are so greatly affected that a look-up table is used to estimate the torque calculations as well. Above about 14.5 Hz the torque calculation is more accurate than the look-up table method and the angle calculation is more accurate than the table method. Therefore the angle calculation is used above this approximate motor operation frequency.

Figure 16:
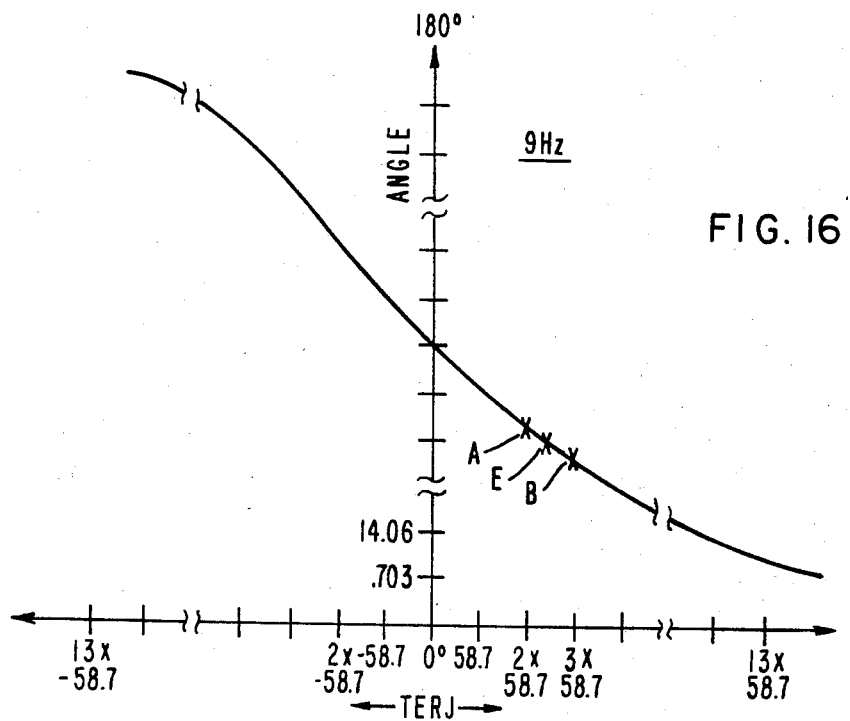
FIG. 16 shows an illustrative curve plot of current angle versus torque for an integer frequency value of 9 hertz.

In FIG. 16 there is provided an illustrative curve plot of current angle versus motor torque request for an inverter frequency of 9 hertz, in relation to the above example of determining the current angle for an inverter frequency of 9.4 hertz.

Figure 17:
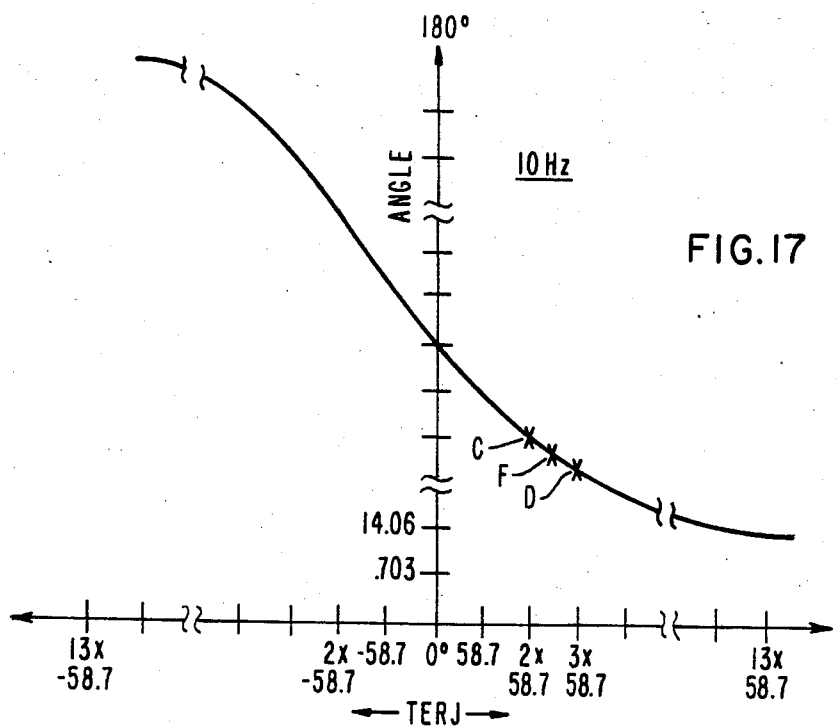
FIG. 17 shows an illustrative curve plot of current angle versus frequency for an interger frequency value of 10 hertz.

In FIG. 17 there is provided an illustrative curve plot of current angle versus motor torque request for an inverter frequency of 10 hertz, in relation to the above example of 9.4 hertz.

Each curve plot of FIGS. 16 and 17 is in relation to current angle segments of 0.703 degree and torque effort request segments of 58.7 foot pounds for the convenience of arithmetic computations. There are plus and minus directions for the torque effort request, and the current angle goes from 0° to 180°. The address for the look-up table corresponds with the TERJ values. The plotted curves illustrate that as the torque becomes more positive, the current angle curve trends toward zero and as the torque becomes more negative, the current angle curve trends toward 180°. In memory there are provided 36 look-up tables, with one such table provided respectively for each integer value of frequency from plus 20 hertz, to minus 15 hertz. The curve is shown in FIG. 16 for 9 herz with the look-up table having 27 locations including 13 locations of negative below zero torque. For each torque value, there is stored in the look-up table the off-line motor model determined corresponding current angle. The stored angle is in units such that one bit is equal to 0.703 degree, which is selected for arithmetic convenience. To determine the current angle in the tables, a motor model is used with an average operating temperature, and for a given torque of the motor and with substantially constant volts per hertz operation such that there is a constant air gap flux in the motor. This permits establishing the look-up tables for low frequency operation where the constant air gap flux operation can be provided. For each value of inverter frequency, a different look-up table is provided.

For the example of a motor frequency of 9.4 hertz, interpolation between the 9 hertz table and the 10 hertz table is required if the TERJ torque request is 2.5 * 58.7 foot pounds, then interpolation between torque values is required.

In the flow chart of FIG. 15, at block 160, U is set equal to the truncated integer value of the inverter frequency of 9.4 hertz, which would be 9 hertz. At block 161 V is set equal to U+1, which would be 10 hertz. At block 162, X is set equal to the truncated integer value of the 2.5×58.7 torque request divided by 58.7, which would be 2. At block 163, Y is set equal to X+1 or 3. At block 164, points A and B are established on the 9 hertz curve and points C and D are established on the 10 hertz curve. A is on the 9 hertz curve at 2 and B is on the 9 hertz curve at 3, as shown in FIG. 16. C is on the 10 hertz curve at 2 and D is on the 10 hertz curve at 3, as shown in FIG. 17. E is determined in block 165 as the interpolated angle on the 9 hertz curve at the actual torque request, which is equal to A plus the slope of the curve times the fractional torque increment between B and A. In block 166, F is determined as the interpolated angle on the 10 hertz curve for the actual torque request. In block 167 the actual current angle is the interpolation between E and F to determine the angle for the example of 9.4 hertz. This interpolation operation between curves is per.se well known to persons skilled in this art.

Figure 18:
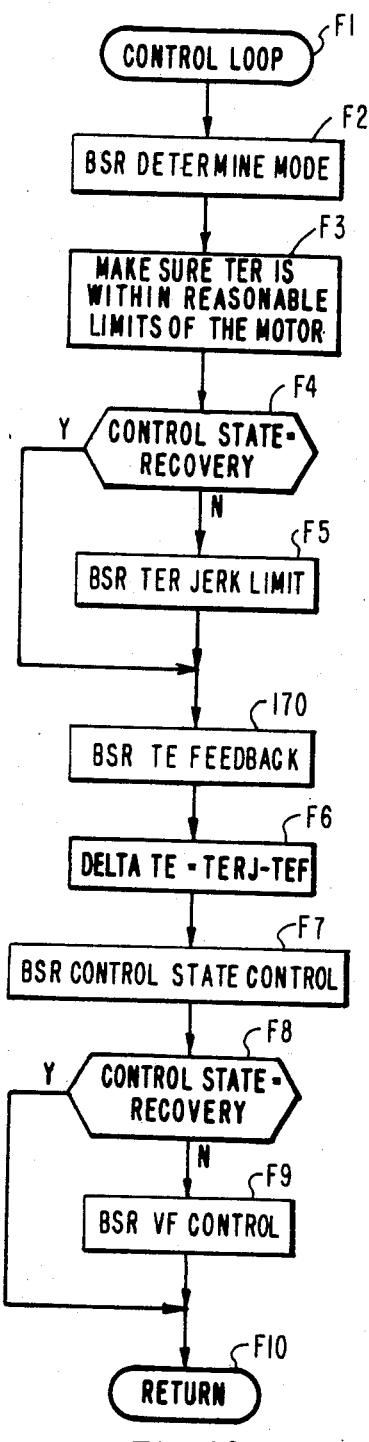
FIG. 18 shows a flow chart of the control loop program disclosed in FIG. 20 of the above-referenced patent application Ser. No. 696,833.

In the control loop subroutine as disclosed in FIG. 18 and in above-referenced patent application Ser. No. 696,833, at block 170 a branch is made to a subroutine called torque effort feedback where the calculation is made of the feedback torque 40 shown in FIG. 2.

Figure 19:
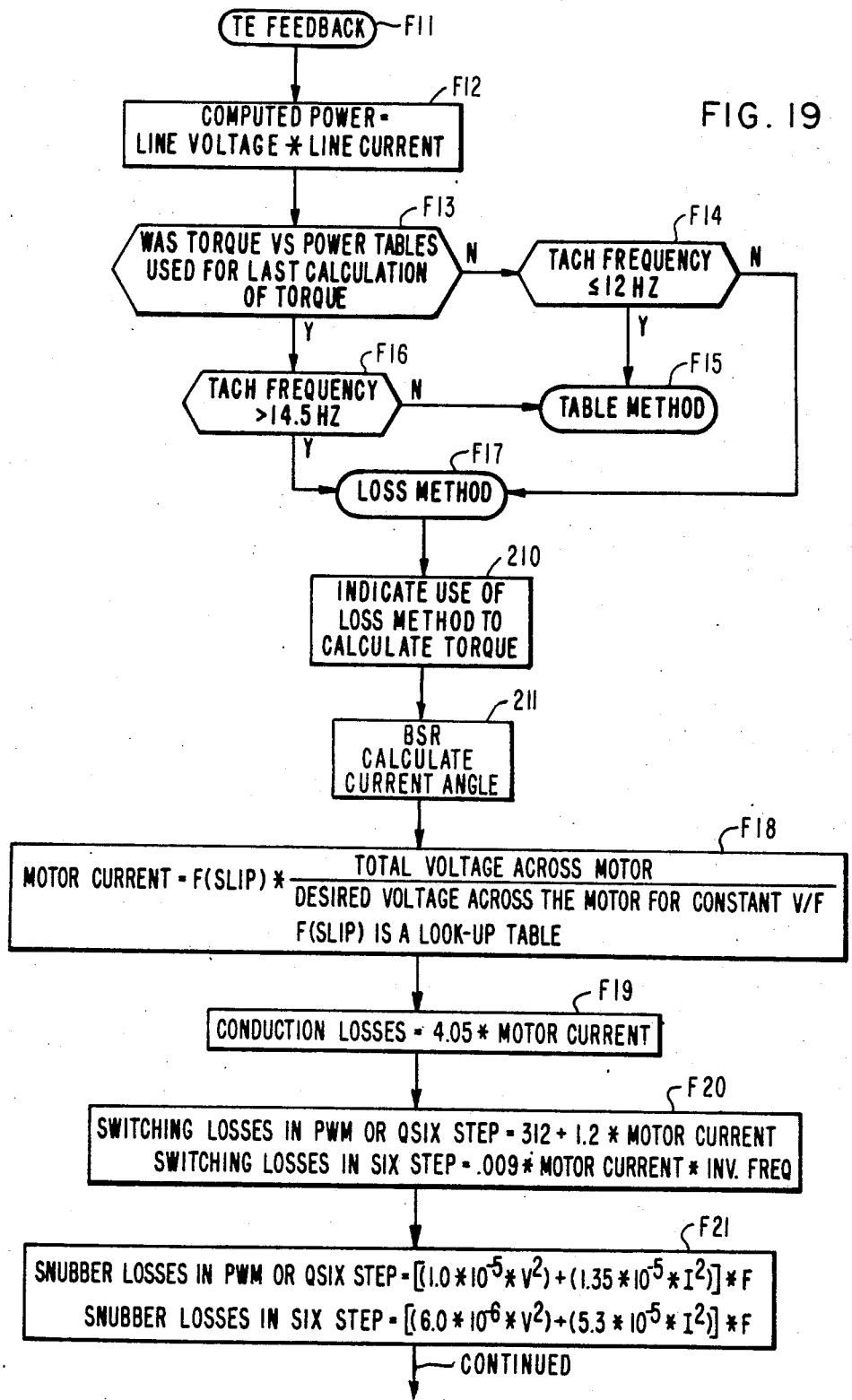
FIG. 19 shows the present modified flow chart for the tractive effort feedback program disclosed in FIG. 4A of the above-referenced patent application Ser. No. 696,832.

In FIG. 19 there is shown a flow chart for a portion of the torque effort feedback routine, which is disclosed in greater detail in above referenced patent application Ser. No. 696,832. After block 210 which indicates a use of the loss method to calculate the torque there is inserted a block 211 providing a branch to a subroutine to calculate current angle, which is the subroutine corresponding to the flow chart shown in FIG. 14 to calculate the angle between the voltage and the current for the motor operation at higher frequencies.

Figure 20:
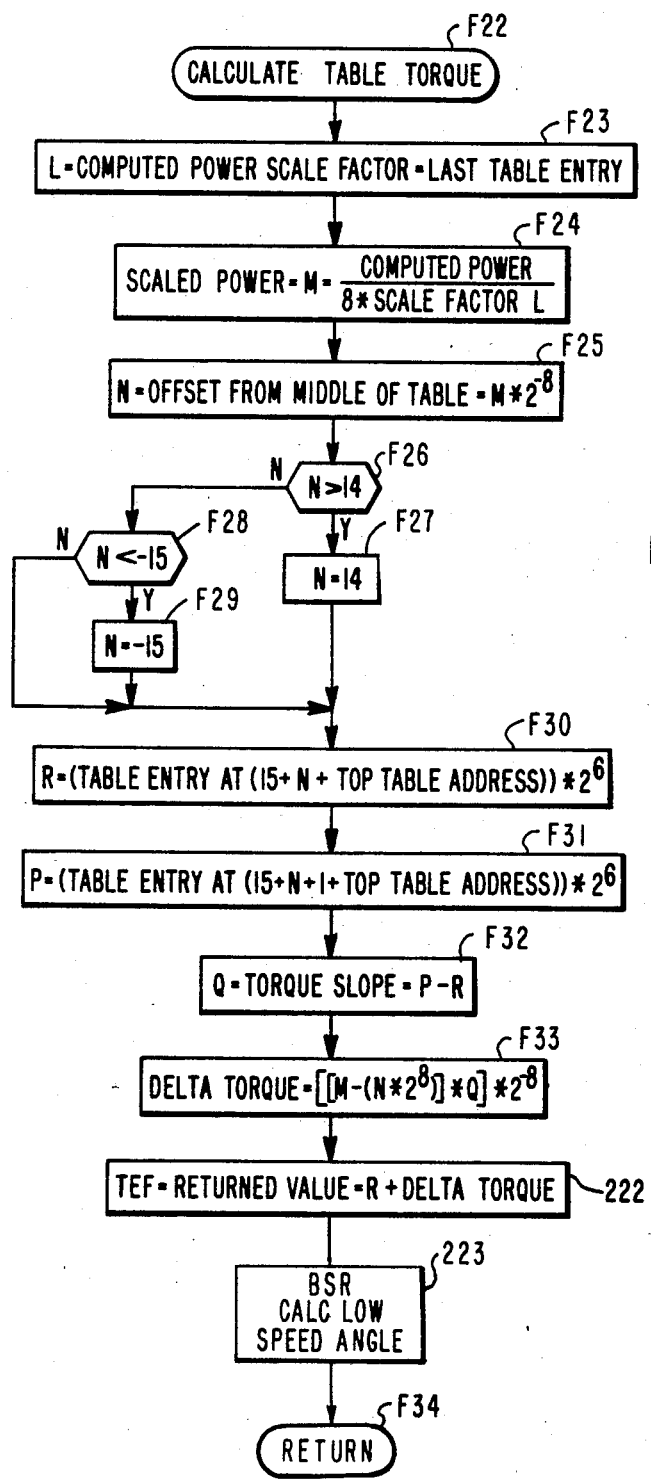
FIG. 20 shows the present modified flow chart for the calculate table torque program disclosed in FIG. 5C of the above-referenced patent application Ser. No. 696,832.

In FIG. 20 is shown the flow chart for a portion of the tractive effort feedback routine which is the table method for torque calculation selected in FIG. 19. After the block 222, a block 223 is provided to branch to the subroutine calculate low speed angle, which corresponds to the flow chart shown in FIG. 15, and is used for motor speeds below about 14.5 Hz as shown in FIG. 19.

Figure 21:
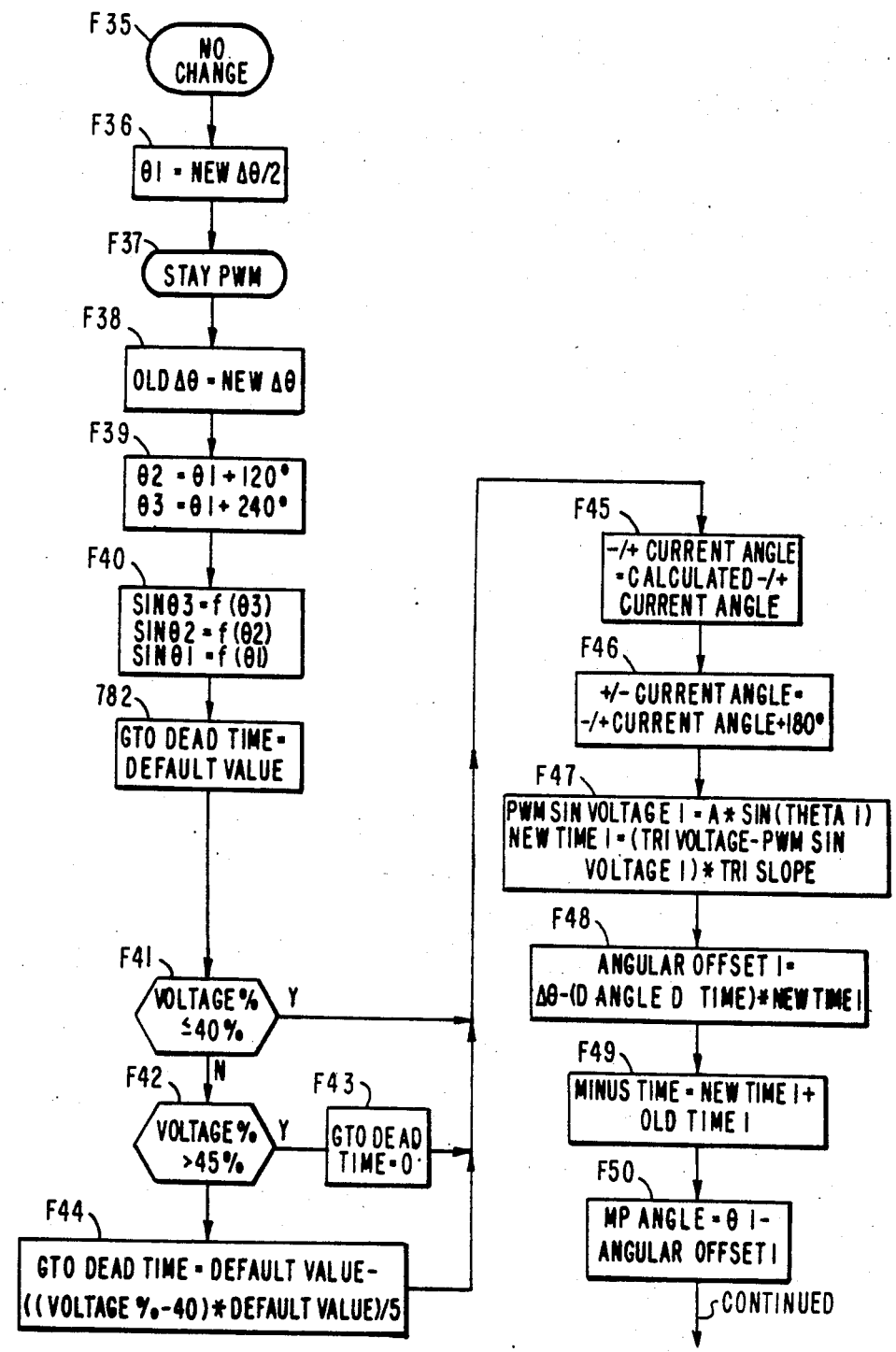
FIG. 21 shows a flow chart for the no change program disclosed in FIG. 43B of the above-referenced patent application Ser. No. 696,814.
Figure 22:
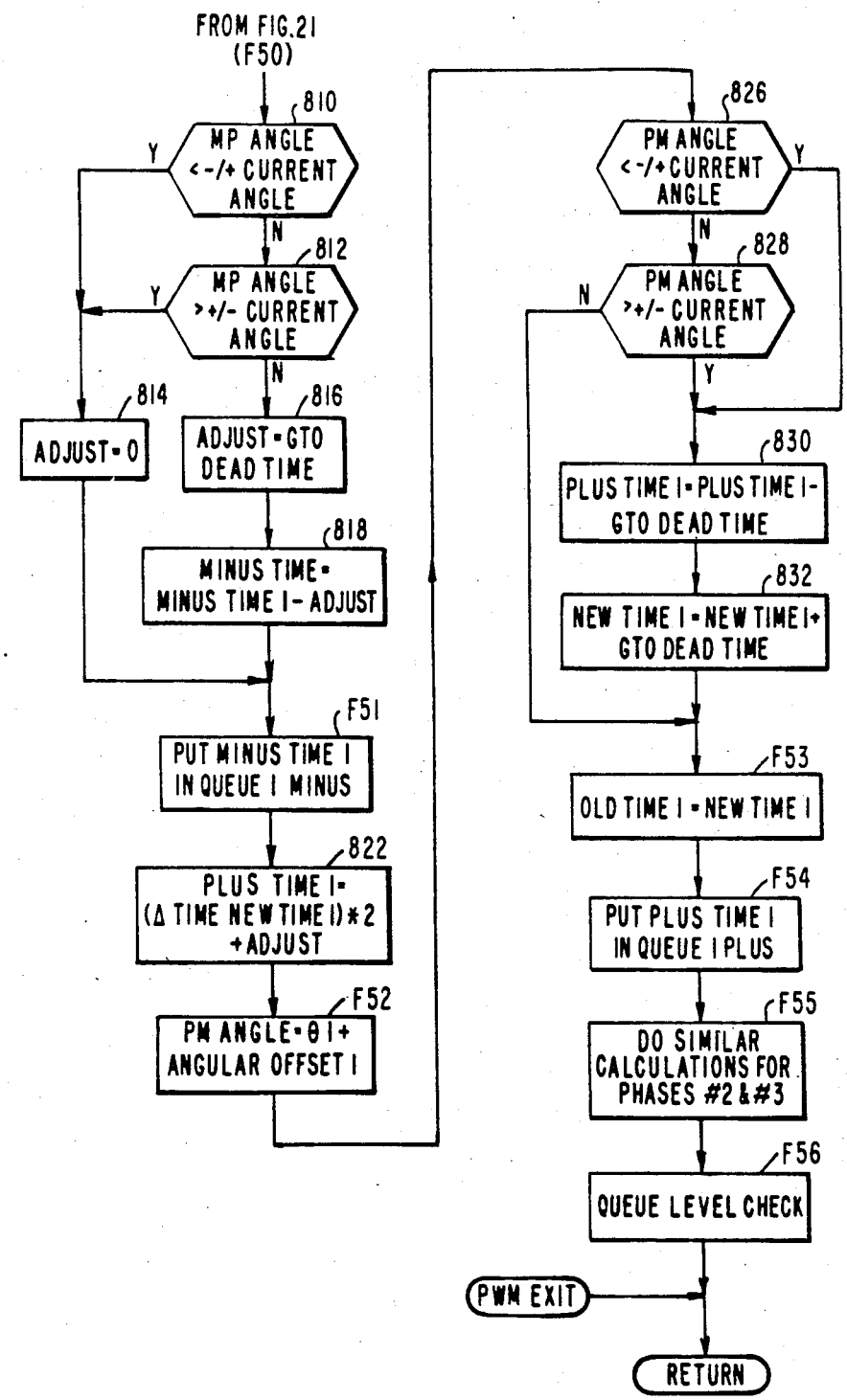
FIG. 22 shows a flow chart which continues to show the no change program disclosed in FIG. 43C of the above-referenced patent application Ser. No. 696,814, as it is combined with the above-mentioned FIG. 21.

In FIG. 21 which continues in FIG. 22 there is shown the no change portion of the PWM calculation subroutine shown at FIGS. 43B and 43C of above cross-referenced patent application Ser. No. 696,814.

In the operation of an actual inverter, dead times where both GTOs are off must be inserted whenever one GTO of a pole is turned off and the other GTO in the same pole is turned on. These dead times last 30 to 35 microseconds and affect the output voltage from the inverter depending upon how much the motor current lags the motor voltage. If the current lag is less than 90° with the motor in power, the inverter output voltage will be reduced. If the current lag is more than 90° with the motor in brake, the inverter output voltage will be increased. At low output voltage percentages, these dead times should be compensated for to provide proper motor operation. The dead times can be properly compensated for by advancing the −GTO to +GTO transition if the motor current flow from the inverter to the motor for that pole is positive at the time of the GTO switch transition. If the motor current is negative from the motor to the inverter at the time of the GTO switch transition, the +GTO to −GTO transition is advanced. This modification of the transition point negates the effects of the GTO dead times. Also other losses in the inverter result in similar dead time voltage effects. These other losses can be compensated for by using a larger than 30 to 35 microsecond adjustment. It has been determined that a value of about 65 microseconds for the transition adjustment practically negates all dead times and inverter losses. The default value in block 782 of FIG. 21 is set equal to this 65 microsecond value. The GTO dead time in block 782 is set equal to the default value and represents the amount of time that the GTO transitions will be adjusted. It is both time consuming and unnecessary for the GTO transitions to be adjusted while in quasi six-step or six-step, so the transition adjustment is phased out while still in the PWM synthesis. Once the requested voltage percent reaches 40% the phase out begins by decreasing the compensation time so that by the time the voltage percent equals 45% this compensation time variable called GTO dead time, is equal to zero. The compensation time must be phased out gradually because a drastic change will result in unwanted motor transients. Block F41 tests the requested voltage percent to see if it is less than or equal to 40%. If yes, a GTO dead time equal to default value will be used. If not, in block F42, the voltage percent is checked against 45%. If greater than 45%, block F43 will set GTO dead time equal to zero, thus eliminating the transition correction. Block F44 is executed if the voltage percent is between 40% and 45% and calculates a GTO dead time value which is between zero and the default value.

We claim:

1. In control apparatus for a load having at least one phase and operative with an inverter including a first switch device and a second switch device for each phase of the load, said inverter being coupled with a power source and responsive to an effort request signal, the combination of first means for determining in response to said effort request signal and in relation to each motor phase the successive first conduction times for the first switch device and the successive second conduction times for the second switch device to supply a desired output voltage having a desired frequency for energizing said phase of said load, second means for determining the current angle between said voltage and the load current, third means for determining in relation to said angle when the output current is positive and when the output current is negative, and fourth means for providing a first modification to one of the first and second conduction times in response to said positive current and providing a second modification to the other of said first and second conduction times in response to said negative current, with said first and second modifications being removed in response to said desired output voltage.

2. The control apparatus of claim 1,
   with the third means decreasing the second conduction time in response to said positive current and decreasing the first conduction time in response to said negative current.

3. The control apparatus of claim 1, with the inverter having a first switch to second switch conduction transition and hving a second switch to first switch conduction transition, said third means determining when the output current is negative during a first switch to second switch conduction transition and determining when the output current is positive during a second switch to first switch conduction transition, with said fourth means advancing the second switch to first switch transition when the output current is positive and advancing the first switch to second switch transition when the output current is negative.

4. The control apparatus of claim 1,
   with the second means determining the angle between said voltage and current in relation to the effort request signal and the inverter frequency.

5. The control apparatus of claim 1, with the conduction time modification from the fourth means being provided during a predetermined synthesis mode of operation established for the inverter.

6. The control apparatus of claim 1, with the fourth means including means precalculating a first modification to said one conduction time and precalculating a second modification to said other conduction time to asynchronously correct for dead time by modifying the firing time and to periodically correct for inverter losses.

7. The control apparatus of claim 1, with the inverter having a requested voltage percent up to a predetermined line voltage limit from said power source,
   with the fourth means determining the respective modifications of the first and second conduction times in response to said requested voltage percent.

8. In the method of controlling a load having at least one phase and operative with an inverter including a first switch device and a second switch device for each phase of the load, said inverter being coupled with a power source and responsive to an effort request signal, the steps of determining for each load phase a first conduction time for the first switch device and second conduction time for the second switch device to supply a desired voltage having a desired frequency for energizing said phase of the load, determining the current angle between said voltage and the load current, determining in response to said current angle when the output current is positive and when the output current is negative, and providing a modification to each of the first and second conduction times in response to said desired voltage and depending on the current angle being positive or negative at the time switching occurs.

9. The method of claim 8,
with the current angle being determined in relation to the effort request signal and the inverter frequency.

10. The method of claim 8,
with a predetermined initial modification to each of the first and second conduction times being provided.

11. The method of claim 8, with the modification of each of the first and second conduction times being responsive to a predetermined percentage of the voltage from said power source.

* * * * *